United States Patent [19]

Hach et al.

[11] Patent Number: 4,878,614
[45] Date of Patent: Nov. 7, 1989

[54] PROGRAMMABLE FERTILIZER APPLICATION SYSTEM

[75] Inventors: Clifford C. Hach; Keith M. Gawlik, both of Loveland, Colo.

[73] Assignee: Hach Company, Loveland, Colo.

[21] Appl. No.: 227,707

[22] Filed: Aug. 3, 1988

[51] Int. Cl.$^4$ ...................... A01C 23/04; A01G 25/09
[52] U.S. Cl. ..................................... 239/10; 239/727; 239/728
[58] Field of Search ............................... 239/727–729, 239/383, 10

[56] References Cited

U.S. PATENT DOCUMENTS

| | | |
|---|---|---|
| 2,726,895 | 12/1955 | Behlen . |
| 3,326,232 | 6/1967 | Stamps et al. . |
| 3,410,490 | 11/1968 | Smith . |
| 3,464,626 | 9/1969 | Stamps et al. . |
| 3,648,930 | 3/1972 | Brown et al. . |
| 3,669,353 | 6/1972 | Hanson et al. . |
| 3,680,778 | 8/1972 | Sission et al. . |
| 3,703,990 | 11/1972 | Erickson . |
| 3,844,481 | 10/1974 | Livingston . |
| 3,901,442 | 8/1975 | Chapman . |
| 4,067,497 | 1/1978 | Cornelius . |
| 4,277,026 | 7/1981 | Garvey . |
| 4,397,421 | 8/1983 | Schram . |
| 4,630,773 | 12/1986 | Ortlip ................................. 239/1 |

Primary Examiner—Andres Kashnikow
Assistant Examiner—William Grant
Attorney, Agent, or Firm—Dean P. Edmundson

[57] ABSTRACT

A system for programming and controlling the rate at which an agricultural chemical (e.g. fertilizer) is supplied to the water in an agricultural irrigation system. In one embodiment the system is combined with a center pivot irrigation system having a vertical water feed pipe, a horizontal boom, and a chemical supply connected to the feed pipe. A rotation sensor determines the degree of rotation of the boom and a controller controls the amount of chemical supplied to the feed pipe. The system enables the amount of chemical applied to be varied from one section of a field to another.

17 Claims, 4 Drawing Sheets

PROGRAMMABLE FERTILIZER APPLICATION SYSTEM

FIELD OF THE INVENTION

This invention relates to spray irrigation systems for agricultural use. More particularly, this invention relates to fertilizer application and control systems for use in connection with conventional spray irrigation systems.

BACKGROUND OF THE INVENTION

Spray irrigation systems are currently used widely in agriculture to provide the water requirements for growing crops (e.g., corn). It is common practice to inject fertilizer into the water which is fed into the irrigation pipes so as to fertilize the crop simultaneously with watering. This is convenient, economical and can be done without use of labor. The time of application is optional, and the rate of feeding of the fertilizer is predetermined and is set in order to provide uniform application to an entire field of crops.

In the usual practice the fertilizer used is a solution of nitrogen compounds or other water soluble materials. Usually, a manually adjustable feed pump is used to meter and feed the fertilizer solution into the water stream flowing through the supply pipe of an irrigation system.

One of the most commonly used irrigation systems is the pivot type, wherein a length of pipe supported by drive wheels is connected at one end to a vertical feed pipe through a rotary joint. Numerous spray nozzles are appropriately arranged along the length of the horizontal pipe (referred to as a boom) through which the water sprays over the crops as the boom pivots around the center of the field.

The horizontal pipe or boom often is one quarter mile long, and thus a circle one-half mile in diameter is covered by one irrigation system. This amounts to about 130 acres being irrigated out of a 160-acre quarter section of farm land. Much longer irrigators are used as well.

The fertilizer solution is usually contained in a tank, located at the center of the pivot. An adjustable feed pump accurately meters the flow of fertilizer from the tank and injects it into the water as it flows under pressure to the pivot. The boom (horizontal irrigation pipe) is supported by power-driven wheels, which rotate the boom around the central pivot, and often results in one revolution of the boom in about 48 hours. Often about an inch of water is uniformly applied during a single rotation of the boom. The water flow rate and speed of rotation are manually adjustable.

The liquid fertilizer feed rate is commonly adjusted to an appropriate desired rate, and left at this fixed rate, until it is desired to change the rate. This is often done during the growing season of the crop. The rate of application of the fertilizer at different stages of crop growth is selected according to the best judgment or desires of the pivot supervisor or farm manager.

Various automated sprinkler systems have been previously described, including center pivot systems and lateral systems. Some of such systems include the capability of applying agricultural chemicals of one type or another to the crops. For example, some systems include means for applying herbicides, insecticides, pesticides, or fertilizer to the crops, either by dissolving such chemicals in the irrigation water to be applied to the crops or by including a separate sprinkler system carried by the irrigation sprinkler system. See, for example, U.S. Pats. Nos. 2,726,895; 3,326,232; 3,410,490; 3,464,626; 3,648,930; 3,669,353; 3,680,778; 3,703,990; 3,844,481; 3,901,442; 4,067,497; 4,277,026; and 4,397,421.

None of such prior systems, however, describe any means for determining what is the most efficient rate of application of agricultural chemical (e.g., fertilizer or other agricultural chemical) in an irrigation system. Thus, a farmer or grower is left to guess at the proper application rate, or to use trial and error techniques over a period of years, or to attempt to approximate the application rate recommended by agricultural agents or various agricultural publications.

The problem is compounded by the fact that soil will vary in constituency from one area of a county to another, or even from one field to another. Soil will also vary in presence of available nutrients from one location to another. Further, weather conditions will vary from one area to another and there is some belief that certain weather phenomena can have an effect on the amount of certain elements found in the soil.

Moreover, the types of crops grown on a particular field in a prior season will affect the types and amounts of nutrients remaining in the soil. Other factors can also affect this.

As a result, efficient use of fertilizer, for example, is very difficult to achieve. Also, the timing of fertilizer application can be critical to achieving the most effective use of the fertilizer. For example, if the fertilizer is not applied to the growing crops in the proper amount and at the proper time there will not be efficient use of the fertilizer.

SUMMARY OF THE PRESENT INVENTION

In accordance with the present invention there is provided a system for programming and controlling the rate at which an agricultural chemical (e.g., fertilizer) is supplied to the water in an agricultural irrigation system.

In one embodiment the system of the invention is combined with a center pivot irrigation system having a vertical water feed pipe, a horizontal sprinkler boom operably coupled to the upper end of the feed pipe by means of a rotatable connector, and an agricultural chemical supply means connected to the water feed pipe. A rotation sensor is operably connected to the rotatable connector and is adapted to determine the degree of rotation of the horizontal sprinkler boom relative to the vertical feed pipe. Control means is operably connected to the rotation sensor means and is adapted to control the amount of agricultural chemical (e.g., fertilizer) supplied to the feed pipe in response to rotation of the sprinkler boom relative to the vertical feed pipe.

The system of the invention allows for programming of the rate of application of an agricultural chemical such as fertilizer to growing crops. The rate of application may be varied from one segment of the field to another.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

In order to provide a very convenient way to conduct trials to determine the optimum rate of fertilizer or other chemical application to a growing crop, a means is herein described by which the application rate of the fertilizer or chemical to the crop can be varied according to a preprogram from low to higher rate with respect to the degrees of rotation of the boom. This is accomplished by attaching to the rotating boom a sensor that detects degrees of rotation and provides such information to a controller which automatically controls the rate of pumping of the liquid fertilizer or chemical into the irrigation water stream.

Figure 1:
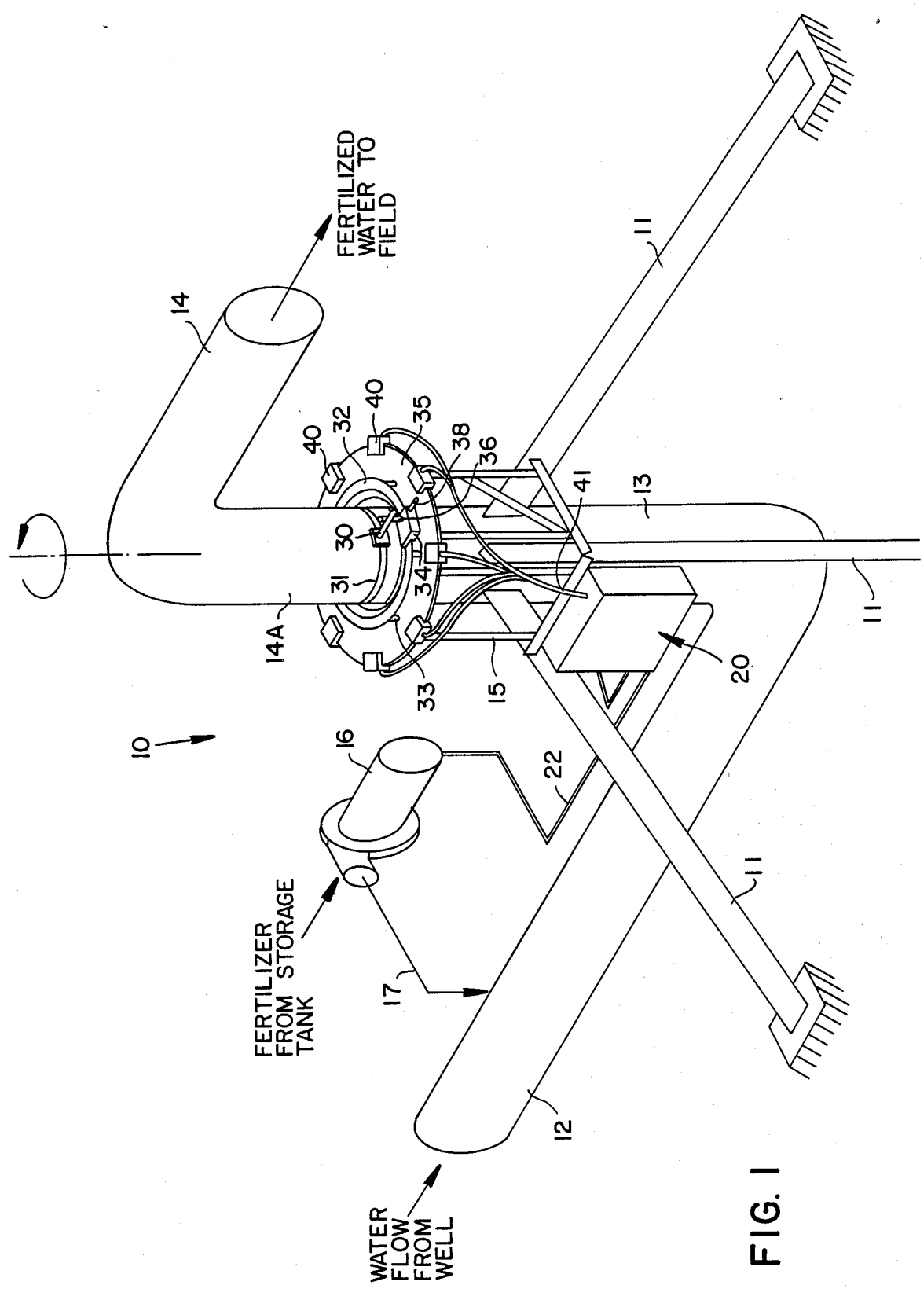
FIG. 1 is a perspective view illustrating the use of a system of the invention on a conventional center pivot irrigation system.

In FIG. 1 there is illustrated the central portion of a center pivot irrigation system 10 which includes a water feed supply pipe 12 (having vertical exit portion 13), and a horizontal sprinkler boom 14 operably connected by an elbow 14A to the upper end of vertical pipe section 13. Elbow 14A serves as a rotatable connector. A plurality of support braces 11 serve to maintain the pipe section 13 in a vertical position. The sprinkler boom may be, for example, 0.25 mile long or even longer if desired. It includes a plurality of sprinkler heads spaced along the boom.

Pump 16 is adapted to pump liquid fertilizer or other desired agricultural chemical from a supply source (e.g. a tank) to the water feed line 12 by means of pipe line 17. The pump is preferably a positive displacement pump.

Figure 2:
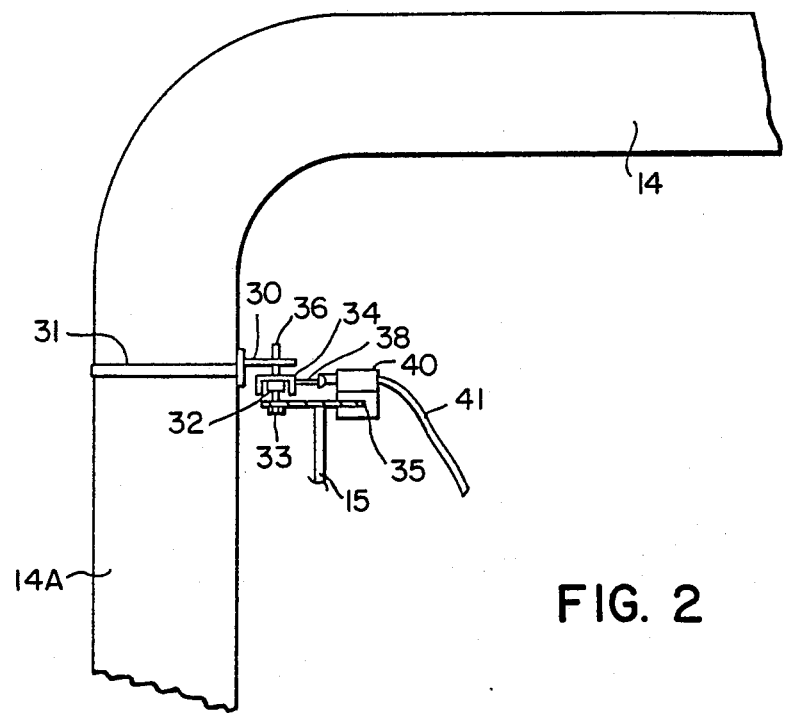
FIG. 2 is a side elevational, partially cut-away, view illustrating the rotation sensor used in the system of FIG. 1.

As shown in FIGS. 1 and 2, a rotation sensor is operably associated with the center pivot system so as to determine the degree of rotation of sprinkler boom 14 relative to the vertical feed pipe section 13. The boom rotates in the direction of the arrow.

The rotation sensor includes a finger 30 secured to elbow 14A by means of a band 31. The finger 30 is disposed horizontally and projects outwardly a few inches.

Ring-shaped plate 35 surrounds the lower end of elbow 14A and is held in fixed position by means of legs 15 secured to support braces 11. Supported above plate 35 by bolts 33 is a ring-shaped track 32. A sliding cart 34 is carried on track 32 and includes upstanding peg or post 36. Finger 30 is adapted to push against post 36 and thereby move cart 34 around track 32 as the sprinkler boom rotates around vertical feed pipe section 13.

A plurality of microswitches 40 are secured to the upper side of plate 35, as illustrated. The number and spacing of the microswitches on plate 35 determines the number and size of individual segments of the field to which different amounts of agricultural chemical can be supplied. For example, when there are eight microswitches evenly spaced around plate 35 the field is divided into 45° segments of a circle. Each microswitch is separately connected by a wire 41 to controller 20. Each microswitch thus controls a discrete portion of the field.

A horizontally disposed arm or finger 38 on cart 34 is adapted to actuate each microswitch separately as the cart is pushed along track 32. Controller 20 is operably connected to the motor for pump 16 which supplies agricultural chemical into water feed line 12.

Figure 3:
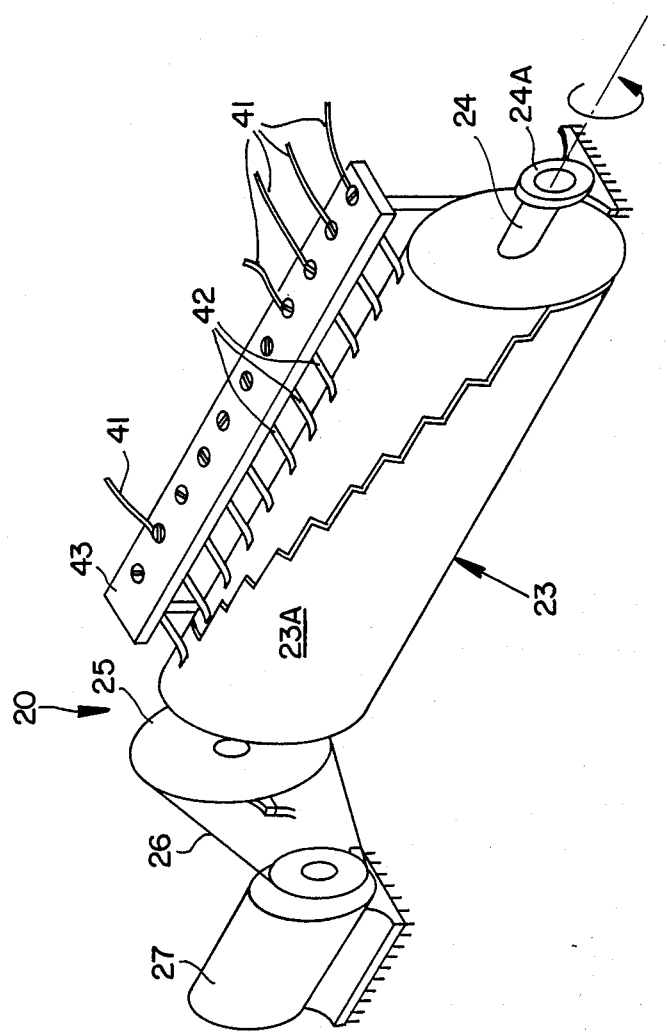
FIG. 3 is a perspective view illustrating one type of controller which is useful in the present invention.

FIG. 3 illustrates one type of controller means 20 which is useful in this invention. There is shown a rotatable drum 23 carried on shaft 24. One end of the shaft is rotatably supported in bearing 24A. The opposite end of the shaft has pulley 25 secured to it. Motor 27 drives pulley 25 by means of belt 26.

The surface of drum 23 is non-conductive except in the areas where it is plated or covered with a conductive film or layer 23A (e.g. copper or aluminum). As illustrated in FIG. 3, the conductive area on the drum varies in a step-wise manner across the length of the drum. In other words, in the embodiment shown in FIG. 3 the conductive area at one end of the drum extends completely around the perimeter of the drum while at the opposite end of the drum the conductive area covers only a small fraction of the perimeter of the drum.

Resilient or springy contacts or brushes 42 are attached at one end to block 43. The free end or projecting end of each contact presses against the surface of the drum 23 as the drum rotates. Each contact 42 is electrically connected by a wire 41 to a respective microswitch 40.

The drum 23 is rotated at a slow speed (e.g. one-half revolution per minute). When a particular microswitch 40 is actuated by the rotation sensor means shown in FIGS. 1 and 2, a respective contact or brush 42 is energized. The fraction of total drum circumference which is conductive at the location of that particular contact or brush determines and controls the amount of fertilizer or chemical applied to the corresponding segment of the field.

Thus, when the contact or brush 42 is in contact with the conductive portion of the drum surface an electrical current is supplied to the motor for pump 16. This causes the chemical to be supplied to the water feed line. For example, if only 50% of the surface of the drum is conductive beneath a particular contact or brush 42, then the pump 16 is activated for only 50% of the time that the sprinkler boom is operating in a corresponding segment of the field.

When the next microswitch is actuated for the next segment of the field a different contact or brush is energized, and the length of the conductive surface on drum 23 beneath that contact or brush determines the length of time the pump is operated to supply chemical to that segment of the field.

Figure 4:
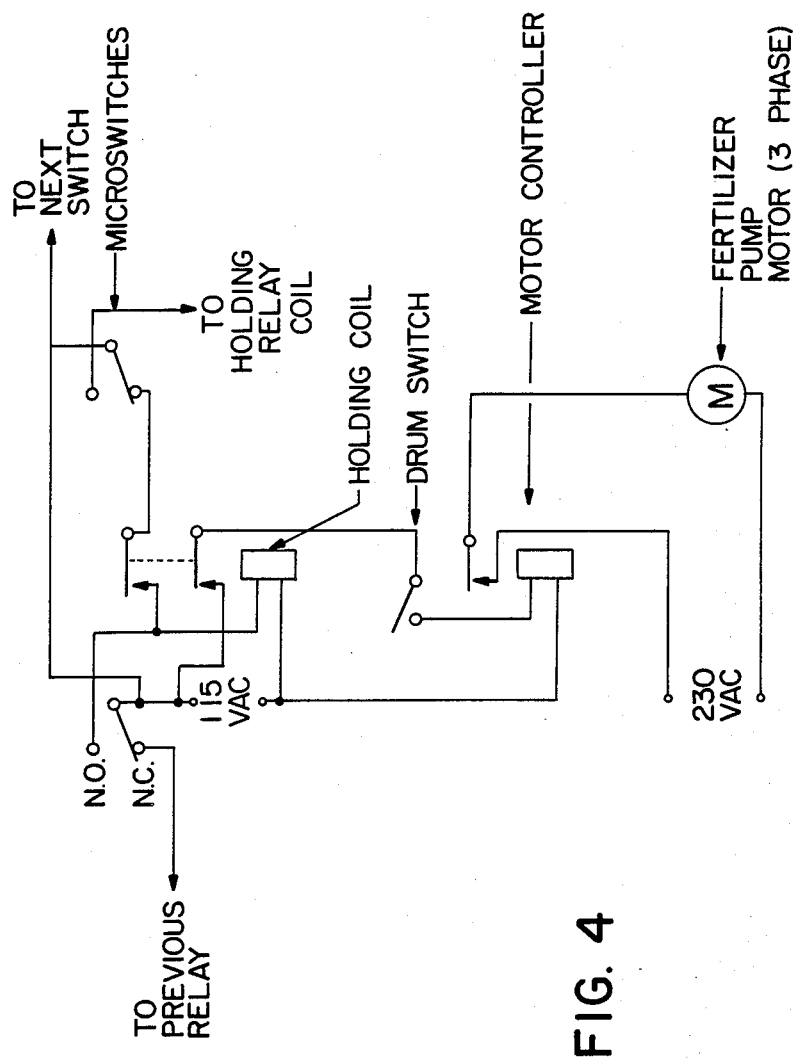
FIG. 4 is an electrical schematic of a control system useful in the present invention.

Holding relays in the circuitry keep each segment's contact or brush energized for a period of time after the microswitch has been actuated. FIG. 4 is a schematic illustrating the use of a holding relay in the circuitry for this purpose.

Figure 5:
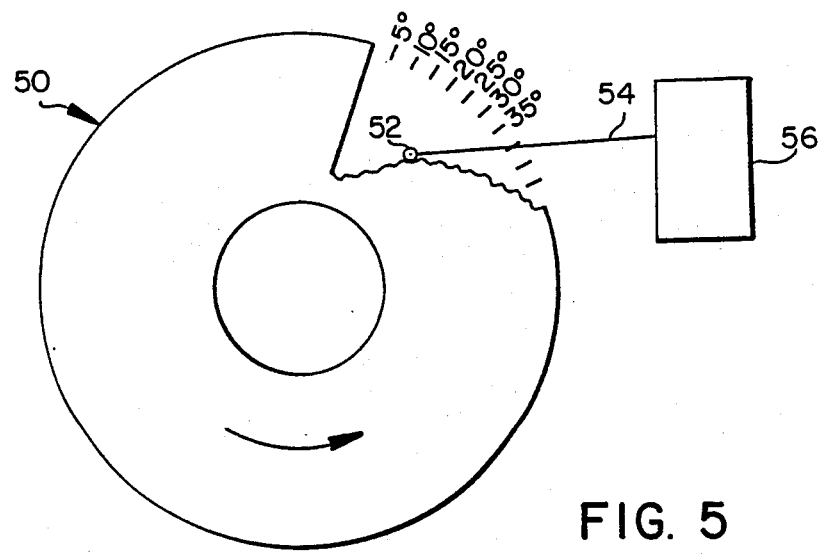
FIG. 5 illustrates another type of controller which may be used in the present invention.

FIG. 5 illustrates another type of rotation sensor means and control means for controlling the amount of agricultural chemical supplied to the water feed pipe. In this embodiment there is a disc 50 which is fitted around the lower end of the elbow in the feed pipe of a center pivot irrigation system and secured to the elbow so that it rotates at the same speed as the sprinkler boom. A portion of the edge of the disc has been cut away to provide a stepped edge. Each step corresponds to a particular segment of the field. For example, it is illustrated in FIG. 5 as 5° segments.

Each step on the disc serves as a cam. A cam follower comprises a roller or wheel 52 rotatably carried at one end of an arm or lever 54. The other end of arm 54 is operably connected to a motor control 56 in a manner such that the speed of a motor running the chemical pump is adjusted in response to the movement of arm 54. In another embodiment the arm 54 could be adapted to control the stroke of a positive displacement pump so as to adjust the volume of liquid chemical dispensed by the pump.

The disc 50 can be inscribed with degrees from 0 to 360 and with concentric rings which correspond to different rates of chemical application. Programming the disc is done by cutting the periphery of the disc (such as with a shear) to shape it to conform to the desired rates of chemical application with respect to degrees of rotation of the boom. Such a disc may be programmed to vary the feed rate of chemicals in a smooth progression corresponding to advancement of rotation of the boom around the field. The disc can be made so as to yield distinct zones of fixed feed rates of chemicals to the growing crops.

Another embodiment for controlling rate of application of chemicals with degree of rotation of the boom involves mounting an optically encoded disc on the rotating elbow of the boom. The disc includes data which is detectable or readable by an appropriate sensor positioned in close proximity to the disc. After the optical sensor detects the code it relays the position of the pivot to a control box. The controller may be, for example, a rotating drum similar to that illustrated in FIG. 3. As another variation, the data can be fed to a microprocessor which in turn controls operation of the chemical supply pump.

Yet another embodiment comprises the use of switches or wires which experience a change in conductive properties with the approach of a certain type of magnetic field. A magnet can be secured to the lower portion of the elbow (i.e. rotating connector for a center pivot irrigation system). The sensors can be supported in a stationary position at desired locations around the rotatable connector. The signal from the sensors can be fed to a rotating drum type of controller or to a microprocessor adapted to control operation of the chemical supply pump.

Yet another embodiment of rotation sensor and control means involves a chain or belt connected around the lower end of the elbow and an adjacent gear or pulley. A shaft connected to the gear or pulley would then be driven synchronously with rotation of the elbow. Rotation of such shaft could control actuation of the chemical supply pump, for example.

Other embodiments for controlling operation of the chemical supply pump as a function of the rotation of the elbow will be apparent.

The system of the invention is very effective and efficient for adjusting and controlling the rate of application of chemicals to growing crops. It is particularly useful in testing situations where it is necessary or desirable to apply different amounts of one or more chemicals to separate segments of a field using a single irrigation system. The techniques of this invention enable preprogramming of the desired amount of chemicals to be applied to each segment of the field.

Then the growing crops in each segment can be tested to determine the most effective and efficient use of the chemicals (such as fertilizer, for example). In the case of corn, for example, a few plants from each segment of the field can be analyzed for uptake and utilization of nitrogen to determine the most efficient and effective amount of nitrogen-based fertilizer to be applied to the growing corn plants. The amount of fertilizer which should be applied to the growing plants may vary depending upon the size of the plants, environmental factors, type of soil, etc. By applying various amounts of fertilizer to different segments of the field it is possible to determine the most efficient amount to be applied to the entire field.

The techniques and systems of the invention can also be utilized in connection with pipe irrigation systems other than the center pivot style, if desired. For example, the techniques could also be used in connection with systems in which a length of irrigation pipe is rolled across a field on large wheels in a straight line. The rotation sensor in such embodiment would travel with the irrigation pipe and would be capable of determining and signalling the separate segments of the field.

What is claimed is:

1. In combination with a center pivot irrigation system having a vertical water feed pipe, a horizontal sprinkler boom operably coupled to the upper end of said feed pipe by means of a rotatable connector, and an agricultural chemical supply means connected to said water feed pipe, wherein the improvement comprises:
   (a) rotation sensor means operably connected to said rotatable connector and being adapted to determine the degree of rotation of said horizontal boom relative to said vertical feed pipe; and
   (b) control means operably connected to said rotation sensor means and being adapted to control the amount of said agricultural chemical supplied to said feed pipe in response to rotation of said horizontal boom relative to said vertical feed pipe.

2. The improvement in accordance with claim 1, wherein said rotation sensor means comprises a cam and a cam follower, wherein said cam rotates in response to the rotation of said connector about said vertical feed pipe, and wherein said cam follower is operably connected to said control means.

3. The improvement in accordance with claim 1, wherein said agricultural chemical is supplied to said feed pipe by means of a variable rate pump.

4. The improvement in accordance with claim 2, wherein said rotation sensor means comprises a disc having portions of its periphery removed so as to provide a non-circular perimeter, wherein said perimeter operates as said cam.

5. The improvement in accordance with claim 1, wherein said rotation sensor means comprises (a) a finger carried by said rotatable connector, and (b) a plurality of microswitches; wherein said finger is adapted to separately actuate said microswitches as said rotatable connector rotates relative to said vertical feed pipe; and wherein each said microswitch is operably connected to said control means.

6. The improvement in accordance with claim 5, wherein said control means comprises a rotating drum having conductive paths thereon, wherein the length of each said conductive path corresponds to the relative amount of said chemical to be supplied to said feed pipe when a corresponding one of said microswitches is activated.

7. The improvement in accordance with claim 1, wherein said rotation sensor means comprises an optically encoded disc carried by said rotatable connector, and further comprising an optical sensor which is adapted to detect the position of said disc relative to said vertical feed pipe.

8. The improvement in accordance with claim 1, wherein said rotation sensor means comprises (a) a magnet carried by said rotatable connector, and (b) magnet sensing means adapted to detect the location of said magnet.

9. The improvement in accordance with claim 1, wherein said rotation sensor means is connected to said rotatable connector by means of an endless flexible drive means.

10. A method for determining plant utilization of fertilizer in a field being irrigated by a center pivot irrigation system of the type having a vertical water feed pipe, a horizontal sprinkler boom operably coupled to the upper end of said feed pipe by means of a rotatable connector, and a fertilizer supply means connected to said water feed pipe, wherein said method comprises the steps of:
(a) providing rotation sensor means,
(b) operably connecting said rotation sensor means to said rotatable connector,
(c) providing control means for controlling the amount of said fertilizer supplied to said feed pipe in response to rotation of said horizontal boom,
(d) operably connecting said control means to said rotation sensor means,
(e) irrigating said plants with said irrigation system and adding said fertilizer to said water feed pipe in an amount which varies from one section of said field to another in response to rotation of said sprinkler boom relative to said vertical feed pipe,
(f) analyzing said plants from each said section of said field to determine said utilization of said fertilizer by said plants in each said section.

11. A method in accordance with claim 10, wherein said rotation sensor means comprises a cam and a cam follower, wherein said cam rotates in response to the rotation of said connector about said vertical feed pipe, and wherein said cam follower is operably connected to said control means.

12. A method in accordance with claim 10, wherein said fertilizer comprises a nitrogen-containing compound.

13. A method in accordance with claim 12, wherein said plants are analyzed for amount of said nitrogen-containing compound present therein.

14. A method in accordance with claim 12, wherein said fertilizer comprises a mixture of ammonium nitrate and urea.

15. A method in accordance with claim 10, wherein said fertilizer is supplied to said feed pipe by means of a variable rate pump.

16. A method in accordance with claim 10, wherein said rotation sensor means comprises (a) a finger carried by said rotatable connector, and (b) a plurality of microswitches; wherein said finger is adapted to separately actuate said microswitches as said rotatable connector rotates relative to said vertical feed pipe; and wherein each said microswitch is operably connected to said control means.

17. A method in accordance with claim 10, wherein said plants are corn plants.

* * * * *